United States Patent
Muradov et al.

(10) Patent No.: US 8,147,765 B2
(45) Date of Patent: Apr. 3, 2012

(54) APPARATUS FOR HYDROGEN AND CARBON PRODUCTION VIA CARBON AEROSOL-CATALYZED DISSOCIATION OF HYDROCARBONS

(75) Inventors: Nazim Z. Muradov, Melbourne, FL (US); Franklyn Smith, Orlando, FL (US); Ali Tabatabaie-Raissi, Melbourne, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 751 days.

(21) Appl. No.: 12/288,802

(22) Filed: Oct. 23, 2008

(65) Prior Publication Data

US 2009/0060805 A1 Mar. 5, 2009

Related U.S. Application Data

(62) Division of application No. 11/431,815, filed on May 10, 2006, now Pat. No. 7,588,746.

(51) Int. Cl.
*B01J 19/08* (2006.01)
(52) U.S. Cl. ............ 422/186.21; 422/186.04; 422/613; 422/618; 422/638; 422/648
(58) Field of Classification Search ............ 422/186.21, 422/186.04, 613, 618, 617, 648, 638, 649, 422/152; 202/96; 219/121.43, 121.47
See application file for complete search history.

(56) References Cited

U.S. PATENT DOCUMENTS

| | | | |
|---|---|---|---|
| 2,476,729 A | 7/1949 | Helmers | 196/52 |
| 2,476,759 A | 7/1949 | Helmers | |
| 2,805,177 A | 9/1957 | Krebs | |
| 2,926,073 A | 2/1960 | Robinson et al. | |
| 3,284,161 A | 11/1966 | Pohlenz et al. | |
| 4,056,602 A | 11/1977 | Matovich | |
| 5,650,132 A | 7/1997 | Murata et al. | |
| 6,395,197 B1 * | 5/2002 | Detering et al. | 252/373 |
| 6,670,058 B2 | 12/2003 | Muradov | |
| 7,157,167 B1 * | 1/2007 | Muradov | 429/411 |
| 7,622,693 B2 * | 11/2009 | Foret | 219/121.43 |

(Continued)

OTHER PUBLICATIONS

Callahan, Michael "Catalytic Pyrolysis of Methane and Other Hydrocarbons" Proc. Conf. Power Sources, vol. 26, (1974) pp. 181-184.

(Continued)

*Primary Examiner* — Nina Bhat
(74) *Attorney, Agent, or Firm* — Brian S. Steinberger; Joyce P. Morlin; Law Offices of Brian S. Steinberger, P.A.

(57) ABSTRACT

A novel process and apparatus is disclosed for sustainable, continuous production of hydrogen and carbon by catalytic dissociation or decomposition of hydrocarbons at elevated temperatures using in-situ generated carbon particles. Carbon particles are produced by decomposition of carbonaceous materials in response to an energy input. The energy input can be provided by at least one of a non-oxidative and oxidative means. The non-oxidative means of the energy input includes a high temperature source, or different types of plasma, such as, thermal, non-thermal, microwave, corona discharge, glow discharge, dielectric barrier discharge, or radiation sources, such as, electron beam, gamma, ultraviolet (UV). The oxidative means of the energy input includes oxygen, air, ozone, nitrous oxide ($NO_2$) and other oxidizing agents. The method, apparatus and process of the present invention is applicable to any gaseous or liquid hydrocarbon fuel and it produces no or significantly less $CO_2$ emissions compared to conventional processes.

8 Claims, 10 Drawing Sheets

U.S. PATENT DOCUMENTS 7,931,889 B2 * 4/2011 Clark et al. .................. 423/650
2007/0111051 A1 5/2007 Muradov

OTHER PUBLICATIONS

Kirk-Othmer, "Carbon (Carbon Black)" Encyclopedia of Chemical Technology, Third Edition, vol. 4, (1992) pp. 651-652.

Lynum, S. et al., "KV Aerner Based Technologies for Environmentally Friendly Energy and Hydrogen Production" Hydrogen Energy Progress XII, Proceedings of the 12th World Hydrogen Energy Conference, Buenos Aires, Argentina, vol. 1, Jun. 21-26, 1998, pp. 637-645.

Muradov, Nazim, "Co2-Free Production of Hydrogen by Catalytic Pyrolysis of Hydrocarbon Fuel" Energy & Fuels, American Chemical Society, (1998), vol. 12, pp. 41-48.

Steinberg, M., "Fossil Fuel Decarbonization Technology for Mitigating Global Warming" International Journal of Hydrogen Energy, vol. 24 (1999) pp. 771-777.

Muradov, N., "Catalysis of Methane Decomposition Over Elemental Carbon" Catalysis Communication, vol. 2 (2001) pp. 89-94.

Callahan, Michael, "Catalytic Pyrolysis of Methane and Other Hydrocarbons," Proc. Conf. Power Sources, vol. 26, (1974) pp. 181-184.

Kirk-Othmer, "Carbon (Carbon Black)," Encyclopedia of Chemical Technology, Third Edition, vol. 4, (1992) pp. 651-652.

Lynum, S., Hildrum, R., Hox, K., Hugdahl, J., "KV Aerner Based Technologies for Environmentally Friendly Energy and Hydrogen Production," Hydogen Energy Progress XII, Proceedings of the $12^{th}$ World Hydrogen Energy Conference, Buenos Aires, Argentina, vol. 1 Jun. 21-25, 1998, pp. 637-645.

Muradov, Nazim, "$CO_2$-Free Production of Hydrogen by Catalytic Pyrolysis of Hydrocarbon Fuel," Energy & Fuels, American Chemical Society, (1998), vol, 12, pp. 41-48.

Muradov, N., "Catalysis of Methane Decomposition Over Elemental Carbon," Catalysis Communication vol. 2, (2001) pp. 89-94.

* cited by examiner

APPARATUS FOR HYDROGEN AND CARBON PRODUCTION VIA CARBON AEROSOL-CATALYZED DISSOCIATION OF HYDROCARBONS

This is a Divisional of U.S. patent application Ser. No. 11/431,815 filed May 10, 2006 now U.S. Pat. No. 7,588,746.

STATEMENT REGARDING FEDERALLY SPONSORED RESEARCH

The subject invention was funded in part by NASA Glenn Research Center, grant number NAG3-2751. The government has certain rights in this invention.

The present invention is related to hydrogen production methods, and, in particular, to a process and an apparatus for the production of hydrogen and carbon via catalytic dissociation of methane and other hydrocarbons.

BACKGROUND AND PRIOR ART

Hydrogen is universally considered a fuel of the future due to environmental advantages over conventional (i.e., fossil-based) fuels. Another important advantage of using hydrogen stems from the fact that it could be electrochemically (i.e., without Carnot-cycle limitation) converted into electricity with very high energy conversion efficiency using fuel cells (FC).

To be used in energy conversion devices, hydrogen has to be produced and stored; however, each of these aspects of hydrogen technology is associated with major technological challenges.

With regard to production, hydrogen can be produced from hydrocarbon fuels, such as, methane ($CH_4$), and natural gas (NG), via oxidative reforming or thermal (thermocatalytic) decomposition processes.

Oxidative reforming involves the reaction of hydrocarbons with oxidants: water, oxygen, or a combination thereof; the corresponding processes are steam reforming, partial oxidation and autothermal reforming, respectively. As a first step, these processes produce a mixture of hydrogen with carbon monoxide (synthesis-gas), which is followed by water gas shift and $CO_2$ removal stages. The total $CO_2$ emissions from these processes exceed 0.4 $m^3$ per each $m^3$ of hydrogen produced.

Thermal (thermocatalytic) decomposition or dissociation of hydrocarbons occurs at elevated temperatures (500-1500° C.) in an inert (or oxidant-free) environment and results in the production of hydrogen and elemental carbon. Due to the lack of oxidants, no carbon oxides are produced in the process. This eliminates or greatly reduces carbon dioxide ($CO_2$) emissions and obviates the need for water gas shift and $CO_2$ removal stages, which significantly simplifies the process. The process produces pure carbon as a valuable byproduct that can be marketed, thus reducing the net cost of hydrogen production. The following is a brief description of the prior art with regard to hydrocarbon thermal (thermocatalytic) decomposition technologies.

Thermal decomposition of natural gas (NG), known as the Thermal Black process, has been practiced for decades as a means of production of carbon black (*Kirk-Othmer Encyclopedia of Chemical Technology*, vol. 4, pages 651-652, Wiley & Sons, 1992). In this process a hydrocarbon stream was pyrolyzed at high temperature (1400° C.) over the preheated contact (firebrick) into carbon black particles and hydrogen, which was utilized as a fuel for the process. The process was employed in a semi-continuous (i.e., cyclic pyrolysis-regeneration) mode using two tandem reactors.

U.S. Pat. No. 2,926,073 to Robinson et al. describes the improved continuous process for making carbon black and byproduct hydrogen by thermal decomposition of natural gas (NG). In this process, NG is thermally decomposed to carbon black and hydrogen gas is used as a process fuel in a bank of heated tubes at 982° C.

Thus, both technological approaches described above, target the production of only one product: carbon black, with hydrogen being a supplementary fuel for the process.

Kvaerner Company of Norway has developed a methane decomposition process, which produces hydrogen and carbon black by using high temperature plasma (CB&H process described in the *Proceedings of 12th World Hydrogen Energy Conference*, Buenos Aires, p. 637-645, 1998). The advantages of the plasmochemical process are high thermal efficiency (>90%) and simplicity, however, it is an energy intensive process.

Steinberg et al. proposed a methane decomposition reactor consisting of a molten metal bath in *Int. J. Hydrogen Energy.* 24, 771-777, 1999. Methane bubbles through molten tin or copper bath at high temperatures (900° C. and higher). The advantages of this system are: an efficient heat transfer to a methane gas stream and ease of carbon separation from the liquid metal surface by density difference.

Much research on methane decomposition over metal and carbon-based catalysts has been reported in the literature. Transition metals (e.g. Ni, Fe, Co, Pd, and the like.) were found to be very active in methane decomposition reaction; however, there was a catalyst deactivation problem due to carbon build up on the catalyst surface. In most cases, surface carbon deposits were combusted by air (or gasified by steam) to regenerate the catalyst's original activity resulting in large amounts of $CO_2$ byproduct.

For example, Callahan describes "a fuel conditioner" designed to catalytically convert methane and other hydrocarbons to hydrogen for fuel cell applications in *Proc. 26th Power Sources Symp.* Red Bank, N.J, 181-184, 1974. A stream of gaseous fuel entered one of two reactor beds, where hydrocarbon decomposition to hydrogen took place at 870-980° C. and carbon was deposited on the Ni-catalyst. Simultaneously, air entered the second reactor where the catalyst regeneration occurred by burning coke off the catalyst surface. The streams of fuel and air were reversed for another cycle of decomposition-regeneration. The reported process did not require water gas shift and gas separation stages, which was a significant advantage. However, due to cyclic nature of the process, hydrogen was contaminated with carbon oxides. Furthermore, no carbon byproduct was produced in this process.

U.S. Pat. No. 3,284,161 to Pohlenz et al. describes a process for continuous production of hydrogen by catalytic decomposition of NG. Methane decomposition was carried out in a fluidized bed catalytic reactor in the range of temperatures from 815° C. to 1093° C. Supported Ni, Fe and Co catalysts (preferably, Ni/$Al_2O_3$) were used in the process. The deactivated (coked) catalyst was continuously removed from the reactor to the regenerator where carbon was burned off, and the regenerated catalyst was recycled to the reactor.

U.S. Pat. No. 2,476,729 to Helmers et al. describes the improved method for catalytic cracking of hydrocarbon oils. It was suggested that air is added to the feedstock to partially combust the feed such that the heat supplied is uniformly distributed throughout the catalyst bed. This, however, would contaminate and dilute hydrogen with carbon oxides and nitrogen.

Use of carbon catalysts offers the following advantages over metal catalysts: (i) no need for the regeneration of catalysts by burning carbon off the catalyst surface, (ii) no contamination of hydrogen by carbon oxides, and (iii) carbon is produced as a valuable byproduct of the process. Muradov has reported on the feasibility of using different carbon catalysts for methane decomposition reaction in *Energy & Fuel*, 12, 41-48, 1998; *Catalysis Communications.* 2, 89-94, 2001.

U.S. Pat. No. 2,805,177 to Krebs describes a process for producing hydrogen and product coke via contacting a heavy hydrocarbon oil admixed with a gaseous hydrocarbon with fluidized coke particles in a reaction zone at 927° C.-1371° C. Gaseous products containing at least 70 volume % of hydrogen were separated from the coke, and a portion of coke particles was burnt to supply heat for the process; the remaining portion of coke was withdrawn as a product.

U.S. Pat. No. 4,056,602 to Matovich teaches high temperature thermal decomposition of hydrocarbons in the presence of carbon particles by utilizing fluid wall reactors. Thermal decomposition of methane was conducted at 1260° C.-1871° C. utilizing carbon black particles as adsorbents of high flux radiation energy, and initiators of the pyrolytic dissociation of methane. It was reported that 100% conversion of methane could be achieved at 1815° C. at a wide range of flow rates (28.3-141.5 l/min).

U.S. Pat. No. 5,650,132 to Murata et al. describes the production of hydrogen from methane and other hydrocarbons by contacting them with fine particles of carbonaceous materials. The carbonaceous materials included carbon nanotubes, activated charcoal, fullerenes $C_{60}$-$C_{70}$, finely divided diamond powder as well as soot obtained by thermal decomposition (or combustion) of different organic compounds or by arc discharge between carbon electrodes in vacuum. The optimal conditions for methane conversion included: preferable methane concentration: 0.8-5 volume % (balance inert gas), the temperature range of 400° C.-1,200° C. and residence times 0.1-50 sec.

U.S. Pat. No. 6,670,058 to Muradov describes the continuous process for hydrogen and carbon production using carbon-based catalysts. The process employs two fluid-solid vessels: a reactor and a heater/regenerator with carbon particles circulating between the vessels in a fluidized state. NG enters a fluidized bed reactor (FBR) where it is decomposed over a fluidized bed of catalytically active carbon particulates at the temperature range of 850° C.-900° C. The resulting hydrogen-rich gas enters a gas separation unit where a stream of hydrogen with a purity of >99.99 volume % is separated from the unconverted methane, which is recycled to the FBR. The carbon particles are directed to a fluidized bed heater where they are heated to 1000-1100° C. by hot combustion gases containing steam and $CO_2$, and simultaneously activated. The main portion of carbon particles is withdrawn from the system as a product.

In summary, the major problem with respect to metal- and carbon-catalyzed decomposition of hydrocarbons relates to gradual deactivation of the catalysts during the process. The deactivation could mainly be attributed to the inhibition of the catalytic process by the carbon deposits blocking the catalyst active sites. This necessitates the regeneration of the catalysts either by complete combustion or gasification of the carbon deposits, in case of metal catalysts or partial gasification of carbon deposits, in case of carbon-based catalysts.

The regeneration step significantly complicates the process and results in contamination of hydrogen with carbon oxides, necessitating an elaborate hydrogen purification step and production of considerable amount of $CO_2$ emission. Thus, there is a need for a more efficient, simple, versatile and sustainable process for the production of hydrogen and carbon from different hydrocarbons without catalyst regeneration and with drastically reduced $CO_2$ emission when compared to conventional processes.

The present invention improves upon and overcomes many of the deficiencies of the prior art.

SUMMARY OF THE INVENTION

A primary objective of the present invention is to develop a sustainable continuous process for hydrogen and carbon production by catalytic dissociation or decomposition of hydrocarbons with drastically reduced $CO_2$ emission.

A second objective of the present invention is to provide a process for the continuous production of hydrogen and carbon via decomposition of hydrocarbon feedstock over carbon aerosol particles acting as a catalyst for the process.

A third objective of the present invention is to provide a process for continuous production of hydrogen and carbon via catalytic decomposition of hydrocarbons over carbon aerosol particles produced from carbonaceous materials including, but not limited to, hydrocarbons, carbon monoxide, alcohols, esters, carbohydrates, biomass, and the like.

A fourth objective of the present invention is to provide a process for continuous production of hydrogen and carbon via catalytic decomposition of hydrocarbons over carbon aerosol particles produced from carbonaceous materials in response to an energy input such as a high temperature source, plasma, irradiation, and the like.

A fifth objective of the present invention is to provide a process for hydrogen production from any gaseous or liquid hydrocarbon including, but not limited to, methane, natural gas, liquefied petroleum gas, gasoline, diesel fuel, sulfurous hydrocarbon fuels.

A sixth objective of the present invention is to provide an apparatus for the continuous production of hydrogen and carbon via decomposition of hydrocarbon feedstock over in-situ generated carbon aerosol particles acting as a catalyst for the process.

A seventh objective of the present invention is to provide an apparatus that combines, in one continuous process, the oxidative and non-oxidative means of generation of carbon aerosol particles from carbonaceous materials to catalyze a single-step, in-situ decomposition of hydrocarbon feedstock to produce hydrogen gas and elemental carbon.

A preferred method for producing hydrogen and elemental carbon from hydrocarbon feedstock using a continuous process includes selecting a reactor vessel having a first reaction compartment for generating carbon particles connected to a second reaction compartment that is a catalytic reactor for dissociation of hydrocarbon feedstock into hydrogen gas and carbon, selecting a carbonaceous material that can be converted to carbon particles, transporting the carbonaceous material to the first reaction compartment where the carbonaceous material is exposed to an energy input that produces an outgoing stream of carbon particles, then, directing the outgoing stream of carbon particles to the second reaction compartment, then, sending a stream of hydrocarbon feedstock to the second reaction compartment where dissociation of the hydrocarbon feedstock occurs over the surface of carbon particles, and collecting hydrogen gas from a first outlet and carbon product from a second outlet of the second reaction compartment.

The preferred carbonaceous material is a substance rich in carbon and is readily converted to carbon particles when exposed to an energy input that achieves temperatures in a range from approximately 100° C. to approximately 5000°

C., temperatures sufficient to convert carbonaceous materials to carbon particles in the first reaction compartment.

The preferred energy input is provided by at least one of a non-oxidative means, an oxidative means, and mixtures thereof. The preferred non-oxidative means of energy input includes, but is not limited to, at least one of a high temperature source, plasma, and irradiation. The preferred oxidative means of energy input is an oxidant selected from at least one of air, oxygen, ozone and nitrous oxide.

The preferred carbonaceous material is a substance with a formula of $C_pH_qX_r$, where X is an element including, at least one of oxygen, nitrogen, sulfur, phosphorus, and $p \geq 1$, $q \geq 0$, $r \geq 0$ The more preferred carbonaceous material includes hydrocarbons and oxygen-, nitrogen-, sulfur- and phosphorus-containing organic compounds, including, at least one of methane, ethylene, propylene, acetylene, benzene, toluene, acetic acid, propanol, carbon disulfide and mixtures thereof, carbon monoxide (CO), carbohydrates and biomass.

The preferred hydrocarbon feedstock is a hydrocarbon with the formula $C_nH_m$ wherein $n \geq 1$, and $(2n+2) \geq m \geq n$. The more preferred hydrocarbon feedstock includes methane, natural gas, propane, liquefied petroleum gas (LPG), naphtha, gasoline, kerosene, jet-fuel and diesel fuel.

Another preferred method for producing hydrogen and carbon from hydrocarbon feedstock using a continuous process includes selecting a reactor vessel having a first reaction compartment for generating carbon particles connected to a second reaction compartment that is a catalytic reactor for dissociation of hydrocarbon feedstock into hydrogen gas and carbon, selecting a hydrocarbon feedstock that is capable of conversion to carbon particles and capable of dissociation into hydrogen gas and carbon, dividing the hydrocarbon feedstock into a first stream and a second stream, transporting the first stream of hydrocarbon feedstock to the first reaction compartment where the hydrocarbon is exposed to an energy input that produces an outgoing stream of carbon particles, directing the outgoing stream of carbon particles to the second reaction compartment, sending the second stream of hydrocarbon feedstock to the second reaction compartment where dissociation of the hydrocarbon feedstock occurs over the surface of carbon particles flowing from the first reaction compartment, and collecting hydrogen gas from a first outlet and carbon product from a second outlet of the second reaction compartment.

The preferred hydrocarbon feedstock is a compound with the formula $C_nH_m$ wherein $n \geq 1$, and $(2n+2) \geq m \geq n$ and is preferably hydrocarbon feedstock of saturated hydrocarbons, unsaturated hydrocarbons, and aromatic hydrocarbons.

The preferred hydrocarbon feedstock is readily converted to carbon particles when exposed to an energy input that achieves temperatures in a range from approximately 100° C. to approximately 5000° C. in the first reaction compartment. The preferred energy input is provided by at least one of a non-oxidative means, an oxidative means and a mixture thereof. The non-oxidative means of the energy input includes at least one of a high temperature source, plasma, and irradiation; whereas, the oxidative means of energy input includes an oxidant selected from at least one of air, oxygen, ozone and nitrous oxide.

A preferred apparatus for producing hydrogen and carbon from hydrocarbon feedstock using a continuous process includes a reactor vessel having a first reaction compartment for generating carbon particles connected to a second reaction compartment that is a catalytic reactor for dissociation of hydrocarbon feedstock into hydrogen gas and carbon, a means for transporting a carbonaceous material that is converted to carbon particles to the first reaction compartment where the carbonaceous material is exposed to an energy input that produces an outgoing stream of carbon particles, a means for directing the outgoing stream of carbon particles to the second reaction compartment, a means for transporting a stream of hydrocarbon feedstock to the second reaction compartment where dissociation of the hydrocarbon feedstock occurs over the surface of carbon particles from the first reaction compartment, and a means for collecting hydrogen gas from a first outlet and carbon product from a second outlet of the second reaction compartment.

The preferred energy input to the first reaction compartment achieves temperatures in a range from approximately 100° C. to approximately 5000° C. and is provided by at least one of a non-oxidative means, an oxidative means, and a mixture thereof. The preferred non-oxidative means of the energy input is at least one of a high temperature source, plasma, and irradiation. The preferred oxidative means of the energy input is an oxidant selected from at least one of air, oxygen, ozone and nitrous oxide.

Another preferred apparatus for producing hydrogen and carbon from hydrocarbon feedstock using a continuous process includes a reactor vessel having a first reaction compartment for generating carbon particles connected to a second reaction compartment that is a catalytic reactor for dissociation of hydrocarbon feedstock into hydrogen gas and carbon, a means for dividing a hydrocarbon feedstock into a first stream that is converted to carbon particles and a second stream that is dissociated into hydrogen gas and elemental carbon, a means for transporting the first stream of hydrocarbon feedstock to the first reaction compartment where the hydrocarbon is exposed to an energy input that produces an outgoing stream of carbon particles, a means for directing the outgoing stream of carbon particles to the second reaction compartment, a means for transporting the second stream of hydrocarbon feedstock to the second reaction compartment where dissociation of the hydrocarbon feedstock occurs over the surface of carbon particles from the first reaction compartment, and a means for collecting hydrogen gas from a first outlet and carbon product from a second outlet of the second reaction compartment.

The preferred energy input achieves temperatures inside the first reaction compartment in a range from approximately 100° C. to approximately 5000° C. and is provided by at least one of a non-oxidative means, an oxidative means, and a mixture thereof. The preferred non-oxidative means of the energy input is at least one of a high temperature source, plasma, and irradiation and the preferred oxidative means of the energy input is an oxidant selected from at least one of air, oxygen, ozone, and nitrous oxide.

Further objects and advantages of the present invention will be apparent from the following detailed description of a presently preferred embodiment which is illustrated schematically in the accompanying drawings.

DESCRIPTION OF THE PREFERRED EMBODIMENTS

Figure 1:
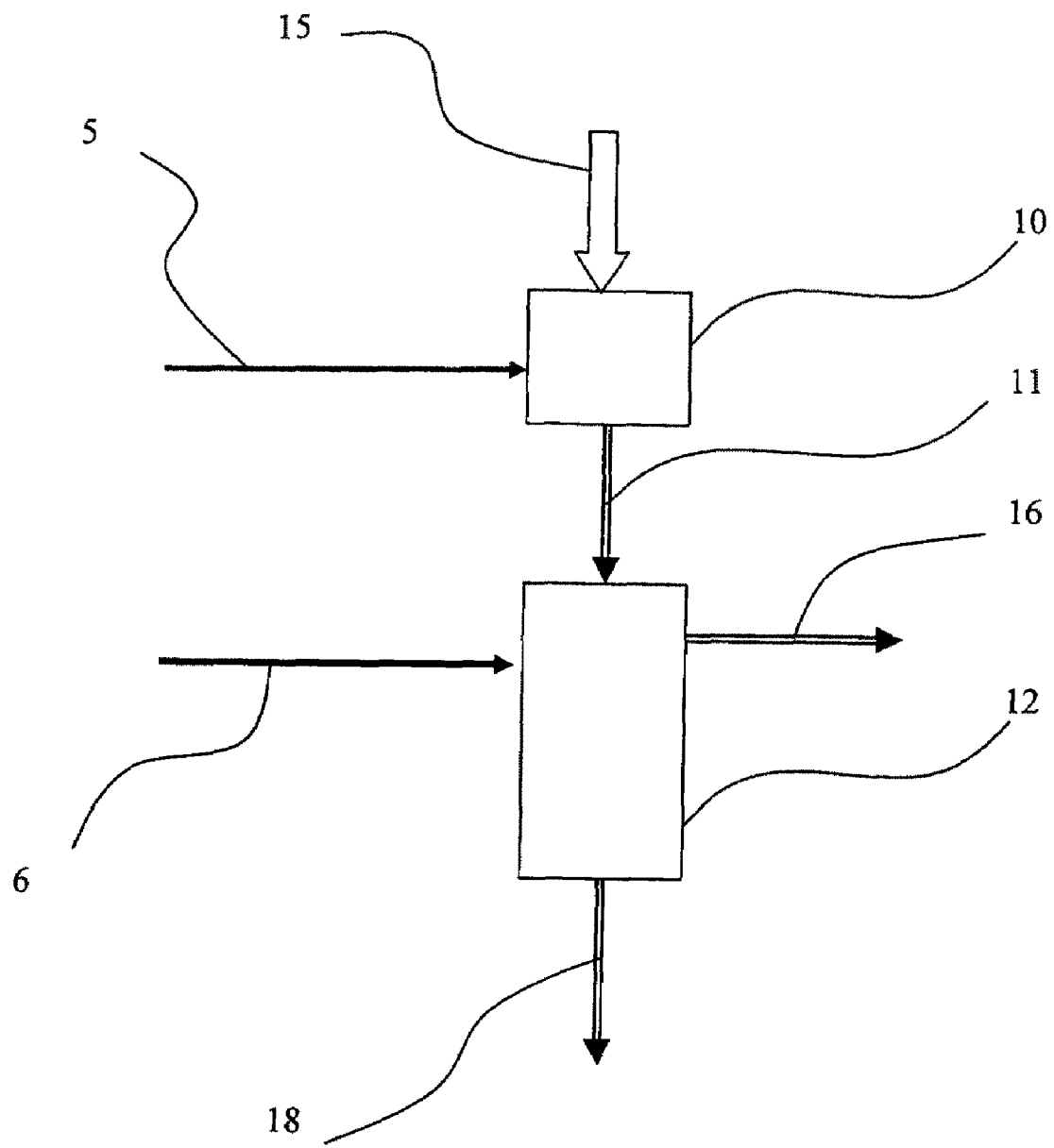
FIG. 1 shows simplified schematics of the general concept of the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The terms, "carbon" and "elemental carbon" are used interchangeably herein when referring to the product of the dissociation of hydrocarbons.

The terms, "carbon particles" (CP), "carbon aerosol particles" (CAP), and "carbon aerosols" are used interchangeably herein when referring to the carbon particles produced in the CAP generator that subsequently function as catalysts in the catalytic converter portion of the apparatus of the present invention.

"Carbonaceous material" as used herein means any substance rich in carbon, which is capable of yielding carbon particles (CP) or carbon aerosol particles (CAP) with the application of energy. The energy input used to convert the carbonaceous material (CM) to carbon particles that easily can become airborne, can be applied via non-oxidative and oxidative means.

The non-oxidative means of the energy input implies that no oxidizing agents are used during production of carbon particles; this include the use of plasma, irradiation and various high temperature sources such as a hot filament, a heating element, a catalytic burner, and the like, wherein the temperatures obtained during the energy input is in a range from approximately 100° C. to approximately 5000° C. The irradiation energy input occurs at lower temperatures, such as approximately 100° C. and thermal plasma temperatures can be as high as approximately 5000° C. or even higher.

The oxidative means of the energy input implies that the production of carbon particles occurs during high-temperature transformation of carbonaceous (CM) in the presence of oxidizing agents such as oxygen, air, ozone, hydrogen peroxide, $NO_2$, and the like, wherein the temperatures obtained during the energy input is in a range from approximately 400° C. to approximately 2000° C.

The present invention provides a continuous process for producing hydrogen and carbon based on a single-step catalytic decomposition of hydrocarbons $C_nH_m$ over in-situ generated catalytically active carbon aerosol particles ($C_{aer}$) according to the generic equation as follows:

$$C_nH_m + (C_{aer}) \rightarrow C_{pr} + m/2 H_2 \quad (1)$$

wherein $n \geq 1$, and $(2n+2) \geq m \geq n$. $C_nH_m$ is hydrocarbon feedstock including, but is not limited to methane, natural gas, propane, liquefied petroleum gas (LPG), naphtha, gasoline, kerosene, jet-fuel and diesel fuel. $C_{pr}$ is carbon product, which comprises original CAP and carbon formed during $C_nH_m$ decomposition and laid down on CAP surface.

CAP can be produced from a great variety of carbonaceous materials (CM) with the general formula of $C_pH_qX_r$, where X is an element including, but not limited to oxygen, nitrogen, sulfur, phosphorus, and $p \geq 1$, $q \geq 0$, $r \geq 0$.

Non-limiting examples of carbonaceous materials (CM) include all classes of hydrocarbons (saturated, unsaturated, aromatic), and a variety of oxygen, nitrogen-, sulfur- and phosphorus-containing organic compounds, including, but limited to ethylene, propylene, acetylene, benzene, toluene, acetic acid, propanol, carbon disulfide and mixture thereof, and carbon monoxide (CO).

According to the preferred embodiment of the present invention, CAP can be formed from CM upon exposure to an energy input, as shown in the following generic equations:

$$C_pH_qX_r + \text{energy input} \rightarrow C_{aer} + \text{products} \quad (2)$$

The energy input to the reaction (2) can be provided by non-oxidative and oxidative means. The non-oxidative means of the energy input includes, but is not limited to a high temperature source, such as, a hot filament, a heating element, a catalytic burner, and the like, or plasma (thermal, non-thermal, microwave, a corona discharge, a glow discharge, a dielectric barrier discharge), or a radiation source (electron beam, gamma, X-ray, UV, and the like).

The oxidative means of the energy input includes, but is not limited to, the use of various oxidizing agents such as oxygen, air, ozone, hydrogen peroxide, $NO_2$, $ClO_2$, and the like. In the presence of the oxidants, partial combustion of CM occurs at elevated temperatures, which results in decomposition of CM into carbon particles and production of combustion products such as water and $CO_2$ and others according to the following generic equation:

$$C_pH_qX_r + [O_x] \rightarrow C_{aer} + H_2O + CO_2 + \text{other products} \quad (3)$$

wherein, $[O_x]$ is an oxidant.

After the carbonaceous material (CM) is exposed to an energy input from oxidative or non-oxidative sources in a CAP generator with internal temperatures in a range of from approximately 100° C. to approximately 5000° C., carbon particles are formed that resemble carbon dust which becomes airborne and is directed to a catalytic reactor, to catalyze the dissociation of hydrocarbon feedstock into hydrogen gas and elemental carbon.

A preferred embodiment of the invention is a process for sustainable, continuous production of hydrogen and elemental carbon via catalytic decomposition of hydrocarbons over in-situ generated carbon aerosol particles comprising the steps of: generating carbon aerosol particles from carbonaceous materials in response to an energy input in a first compartment of a reactor vessel; directing airborne carbon particles to a second compartment of a reactor vessel for catalytic decomposition of hydrocarbon feedstock over said carbon aerosol particles at elevated temperatures in the reactor; recovering a stream of hydrogen-containing gas (HCG); directing said HCG to a gas separation unit where pure hydrogen is separated from the stream; recovering carbon product from the second compartment of the reactor and collecting it as a final product. An apparatus is also described for carrying out the above-identified process.

Reference is now made to FIG. 1, which illustrates the general concept of the present invention. The stream of carbonaceous material 5 enters the CAP generator 10 where carbon particles or carbon aerosol particles are produced when carbonaceous material (CM) is exposed to an energy input 15, which can be provided by non-oxidative, or oxidative means or a combination thereof. A stream of carbon aerosol particles 11 is introduced into the catalytic reactor 12. The stream of hydrocarbon feedstock 6 enters the catalytic reactor 12 where its dissociation occurs during contact with the surface of carbon aerosol particles (CAP) thereby producing hydrogen 16 and carbon 18. Hydrogen gas 16 exits the reactor. Solid carbon particles lay down on the surface of CAP and form a final carbon product 18, which exits the reactor 12.

Figure 2:
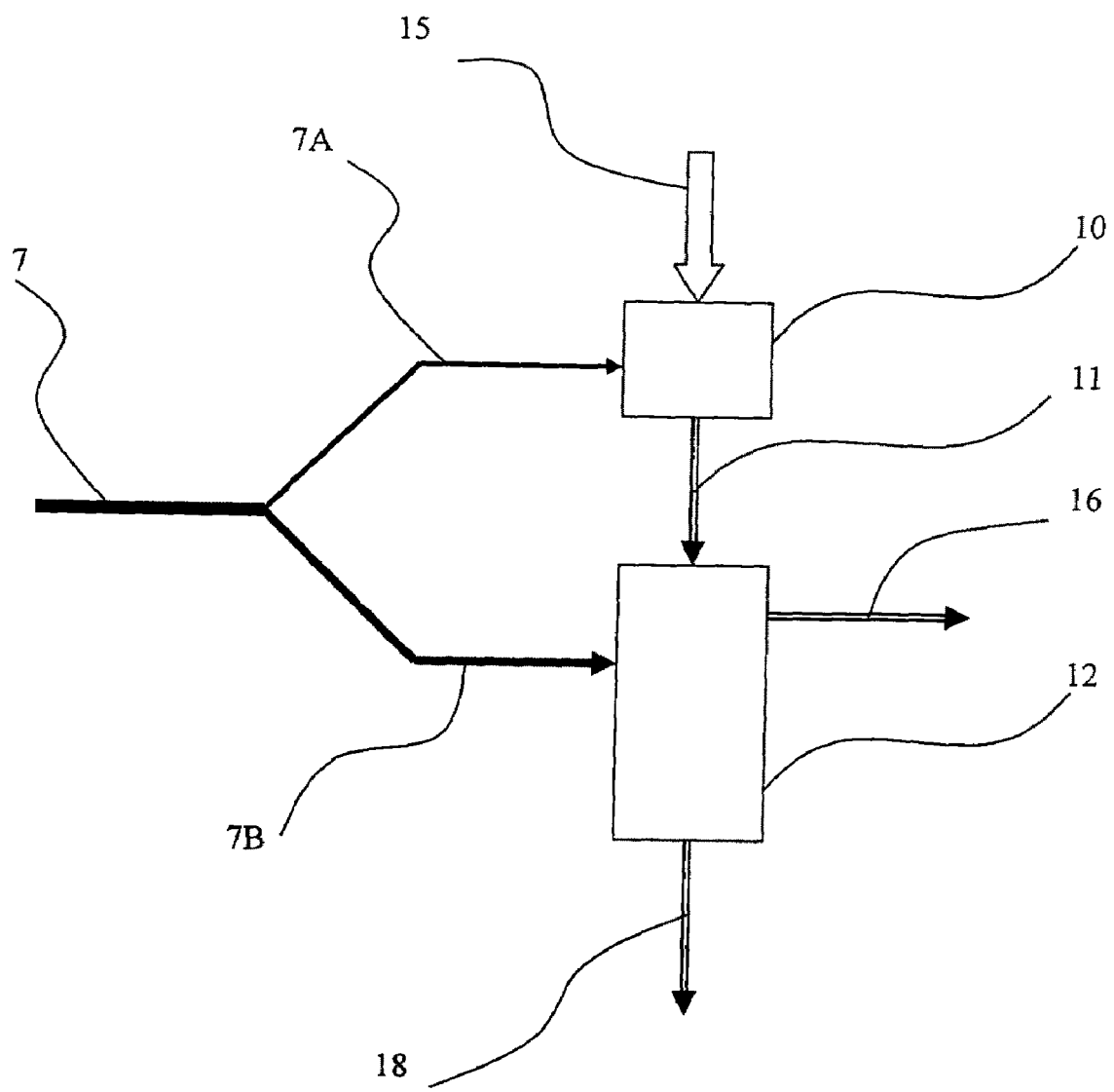
FIG. 2 shows schematics of the present invention where carbonaceous material is a hydrocarbon.

FIG. 2 illustrates the invention for the first embodiment where carbonaceous material (CM) is hydrocarbon, more specifically, a hydrocarbon that is a source of carbon aerosol particles. In this embodiment of the invention, the hydrocarbon stream 7 is split into two streams 7A and 7B. Smaller stream 7A enters the CAP generator 10, where carbon aerosol particles are produced upon hydrocarbon exposure to an energy input 15. A stream of carbon aerosol particles 11 is introduced into the catalytic reactor 12, where dissociation of hydrocarbon feedstock from stream 7B occurs during contact with the surface of carbon aerosol particles (CAP) thereby producing hydrogen 16 and carbon 18. Hydrogen gas 16 exits the reactor. Solid carbon particles lay down on the surface of CAP and form a final carbon product 18, which exits the reactor 12. It should be apparent to one skilled in the art that the concept can be applied not only to hydrocarbons, but to any other carbonaceous material that can produce carbon aerosols upon exposure to an energy input.

Figure 3:
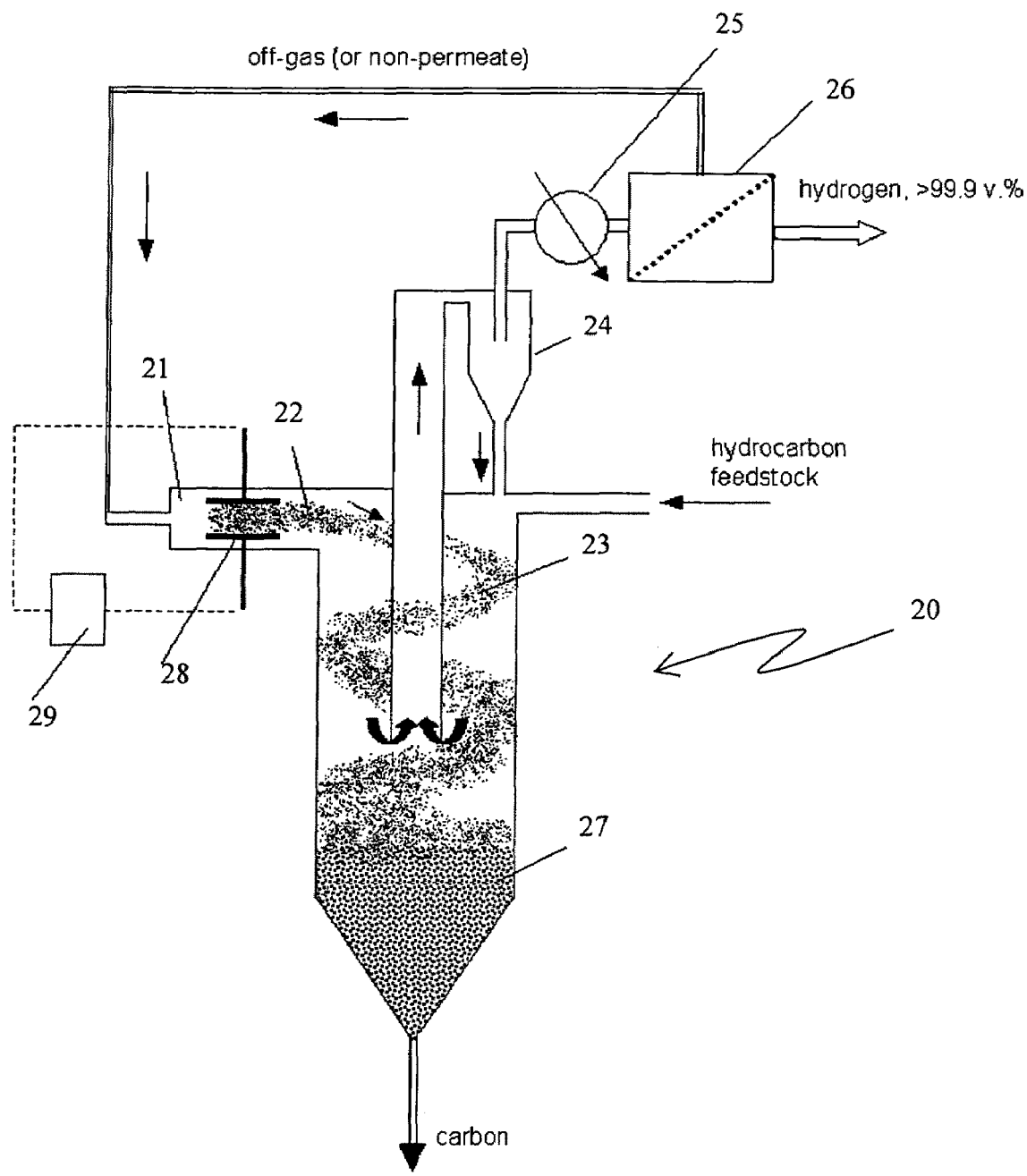
FIG. 3 is a schematic diagram of the process and apparatus for the production of hydrogen and carbon from a hydrocarbon feedstock.

The invention is further illustrated by FIG. 3, which provides a simplified schematic diagram of the process for production of hydrogen and carbon from hydrocarbon feedstock. Carbon aerosol particles are produced in the aerosol production section 21 of the reactor 20. The stream of carbon aerosols 22 enters the catalytic section 23 of the reactor 20 where carbon-catalyzed decomposition of hydrocarbon feedstock occurs at 700-1200° C., preferably, 850-1000° C., and pressure 1-50 atm, preferably, 2-25 atm.

The vortex configuration of the reactor 20 allows for an adequate mixing and contact time between the carbon aerosol particles and the hydrocarbon feedstock. The residence time within the reaction zone is 0.01-600 seconds (s), preferably, 1-60 s. The concentration of hydrogen in the effluent gas from the reactor 20 depends on the nature of hydrocarbon feedstock, temperature, residence time and varies in the range of 10-90 volume %, with the balance being mostly methane and higher hydrocarbons, such as, $C_2+$, including ethylene and other light unsaturated hydrocarbons.

The hydrogen-rich gas exits the reactor 20, through a series of cyclones 24 and a heat exchanger 25 and is then directed to a gas separation unit (GSU) 26, where a stream of hydrogen with the purity of 99.99 volume % is separated from the gaseous stream. The GSU can include a gas separation membrane, a pressure swing adsorption (PSA) system, a cryogenic adsorption unit, or any other system capable of separating hydrogen from hydrocarbons.

Non-permeate gas or PSA off-gas is directed to the aerosol production section 21 of the catalytic reactor 20 where it is decomposed in the presence of a non-thermal plasma with the production of hydrogen-rich gas and carbon aerosols 22 that enter the reaction zone 23. The recycle gas (or PSA off-gas) consists mainly of unconverted hydrocarbons and pyrolysis products: olefins and aromatics Alternatively, a portion of hydrocarbon feedstock could be directed to the aerosol-generator 21 to produce carbon aerosol particles (this option is not shown in FIG. 3). The non-thermal plasma is produced by means of electrodes 28 made of graphite or metals and a power source 29.

One of the important findings of this invention is that the decomposition of olefins and aromatic hydrocarbons generates carbon particles with particularly high catalytic activity toward hydrocarbon decomposition. In FIG. 3, carbon product 27 is collected in the bottom section of the vortex reactor 20 in the form of carbon particles approximately 100 microns in diameter, and can be continuously withdrawn from the reactor and stored in a carbon collector (not shown in the FIG. 3). Due to low thermal energy requirements (i.e., endothermicity) of the hydrocarbon decomposition process and elimination of several gas conditioning and catalyst regeneration stages, the overall $CO_2$ emission from the proposed process would be significantly less than from conventional processes, such as, steam methane reforming.

Figure 4:
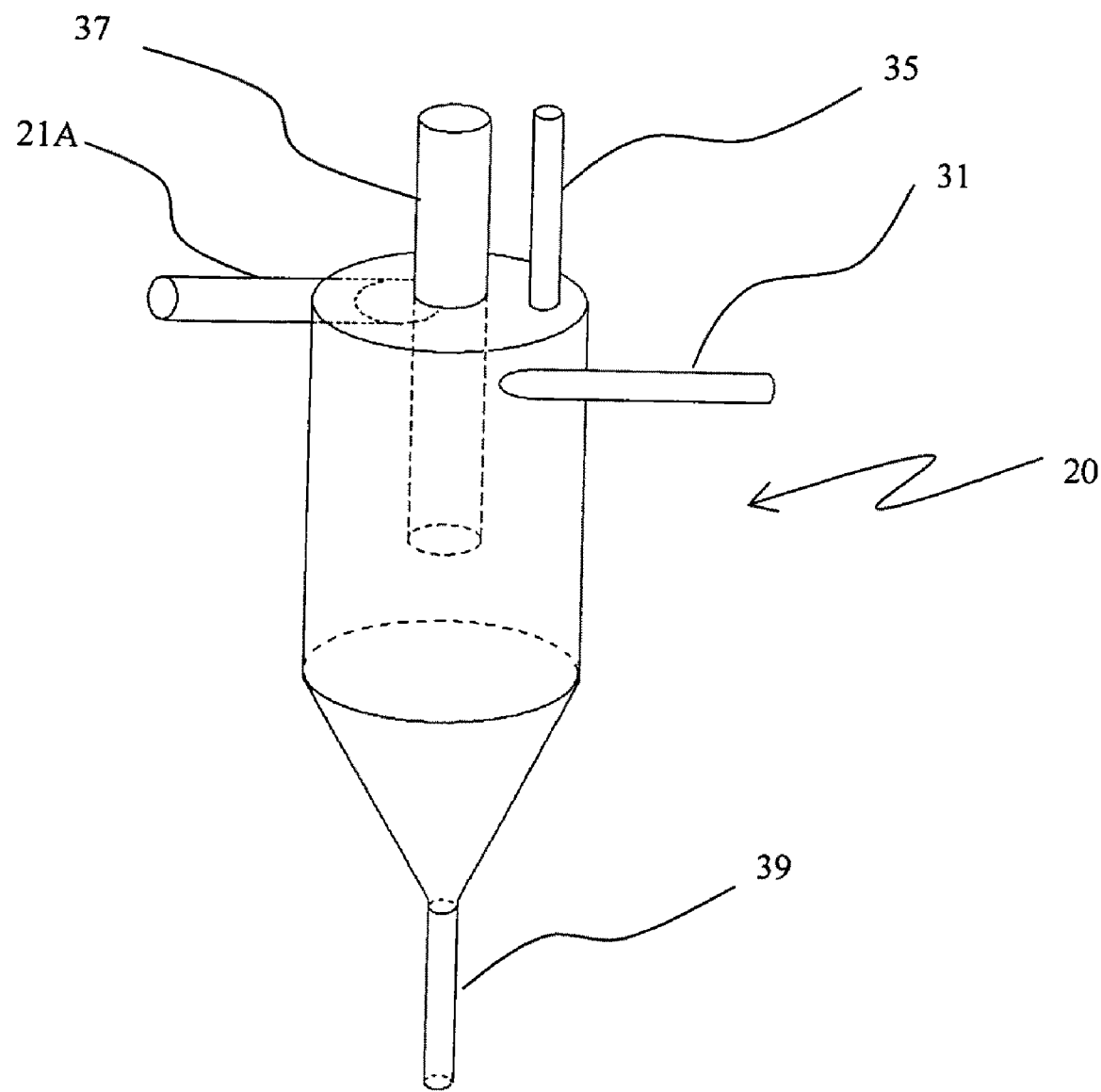
FIG. 4 is a perspective view of the reactor

FIG. 4 is a perspective view of the reactor of the present invention showing the inlet tube 21A connected to the aerosol generating section 21 (shown in FIG. 3), the outlet for hydrogen gas 37, the inlet 35 for carbon particles collected in the cyclone 24 (shown in FIG. 3), inlet for the hydrocarbon feedstock 31, and the carbon product outlet 39.

Figure 5:
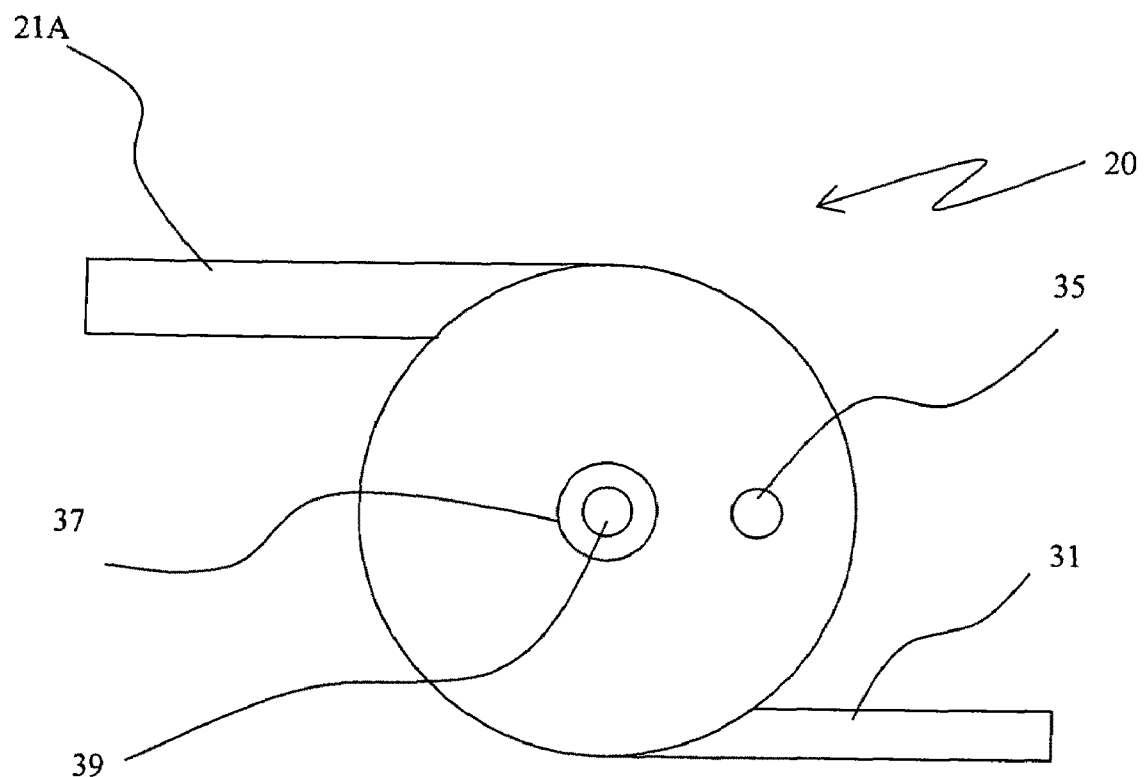
FIG. 5 is a plan view of the reactor

FIG. 5 depicts the plan view of the reactor 20 for carbon aerosol-catalyzed decomposition of hydrocarbons. FIG. 5 is a view of the top side showing the inlet for carbon aerosol particles 21A which is connected to the aerosol generating section 21 (shown in FIG. 3), the hydrogen gas outlet 37, the inlet 35 for carbon particles from the cyclone 24 (shown in FIG. 3), carbon product outlet 39, and the hydrocarbon feedstock inlet 31.

In the second embodiment of the invention an oxidant (e.g., oxygen or air) is introduced to the carbon aerosol particle (CAP) generating section 21 of the reactor 20 resulting in the production of a stream of carbon aerosols via partial combustion of the hydrocarbon feedstock or the recycle gas (off-gas). Input of energy in the form of non-thermal plasma or other energy source for the production of CAP in this case is not necessary. The rest of the procedure is similar to that described for the first embodiment. It is apparent to one skilled in the art that the invention is capable of other embodiments, for example, any combination of a non-oxidative and oxidative means of the energy input, such as a combination of non-thermal plasma with oxygen.

Thus, the present invention significantly simplifies the catalytic hydrocarbon decomposition process by eliminating the catalyst regeneration step, and, thus, improves its efficiency and sustainability. The improvement is achieved by continuous in-situ generation of catalytically active carbon particles that efficiently decompose hydrocarbon feedstocks into constituent elements: hydrogen and carbon. This also allows the elimination or significant reduction in overall $CO_2$ emissions from the process.

EXAMPLES

Figure 6:
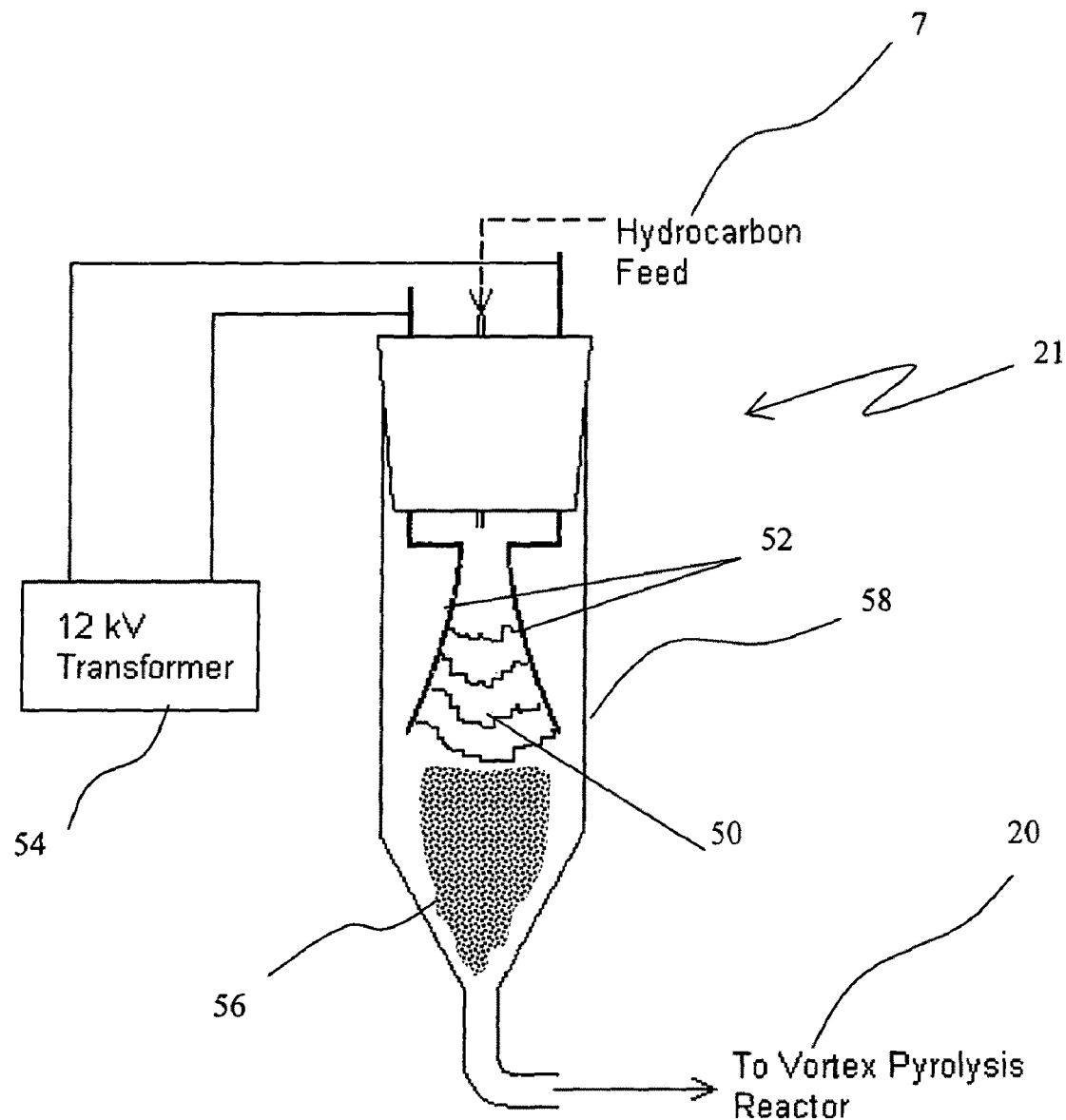
FIG. 6 shows schematics of the experimental unit for production of carbon aerosol particles

Experiments demonstrated technical feasibility of the present invention. FIG. 6 depicts the schematics of the carbon aerosol generator 21 consisting of at least two electrodes 52 placed inside a tubular or other shape vessel 58. Electrodes are made of graphite or a variety of metals and/or their alloys, such as iron (Fe), nickel (Ni), copper (Cu), stainless steel, nickel-copper (Ni—Cu) alloy, and the like. A power source 54 supplies high voltage to the electrodes resulting in the generation of non-thermal plasma discharge 50.

Hydrocarbon feed 7 enters the CAP generator 21, and is exposed to the non-thermal plasma 50 which can create temperatures above 900° C. causing hydrocarbon dissociation and formation of carbon aerosol particles 56 that become airborne and are carried away by the gaseous stream or drop via gravitational pull into the vortex pyrolysis reactor 20.

Figure 7:
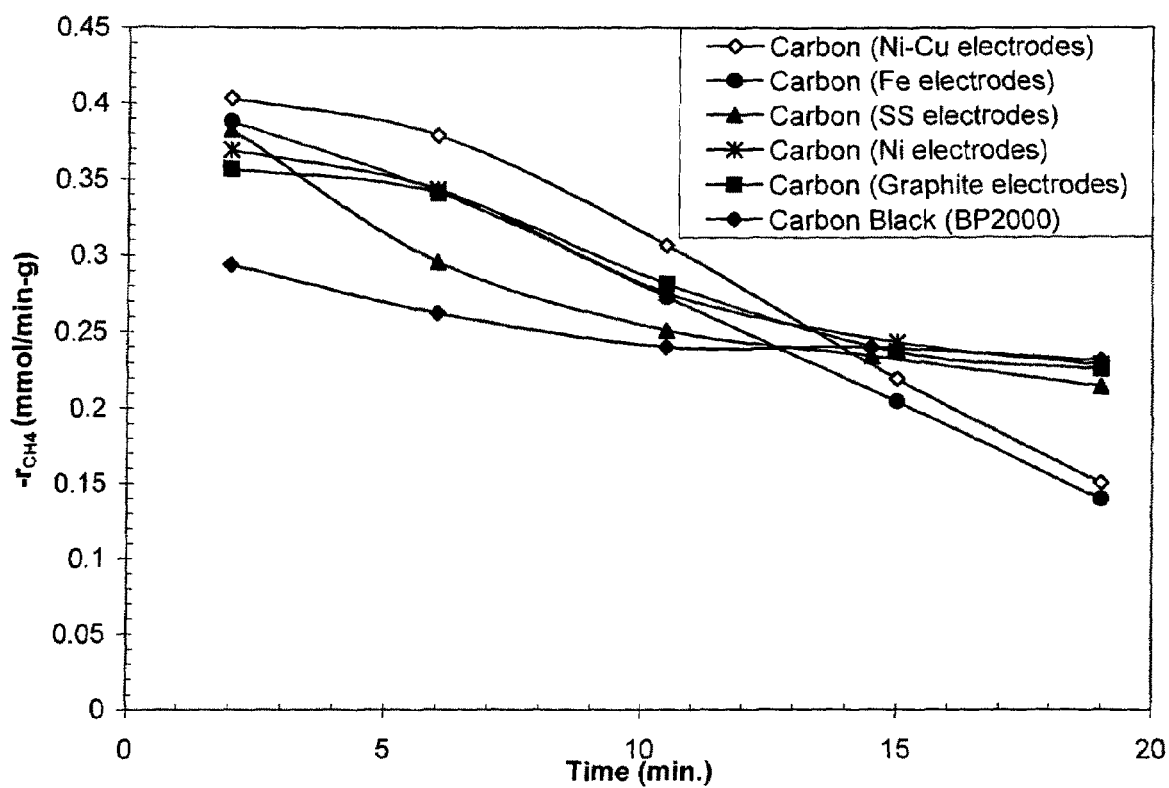
FIG. 7 is a graph of the kinetics of methane decomposition over carbon aerosol particles produced by non-thermal plasma using different electrode materials FIG. 8 provides experimental data on methane catalytic decomposition using carbon aerosol particles produced by non-thermal plasma.

FIG. 7 is a graph of experimental results of methane decomposition at 850° C. using carbon aerosol particles as a catalyst. Carbon aerosol particles were produced by non-thermal plasma-assisted decomposition of methane using graphite and metal (Fe, Ni, stainless steel, Ni—Cu) electrodes. The catalytic activity is expressed as a rate of methane decomposition per unit of weight of carbon. The carbon aerosols produced were compared to that of carbon black BP2000, which is a state-of-the-art carbon catalyst exhibiting highest catalytic activity within the carbon black family; it has a surface area of 1500 m²/g.

It is evident from kinetic curves presented in FIG. 7 that all samples of carbon aerosol particles produced demonstrated higher initial catalytic activity in methane decomposition compared to the baseline catalysts BP2000. Carbon aerosols produced in the non-thermal plasma device with Ni—Cu electrodes showed the highest catalytic activity during the time interval from approximately 1 minute to approximately 13 minutes. The significantly high catalytic activity occurs with no need for regeneration of the catalyst.

Figure 8:
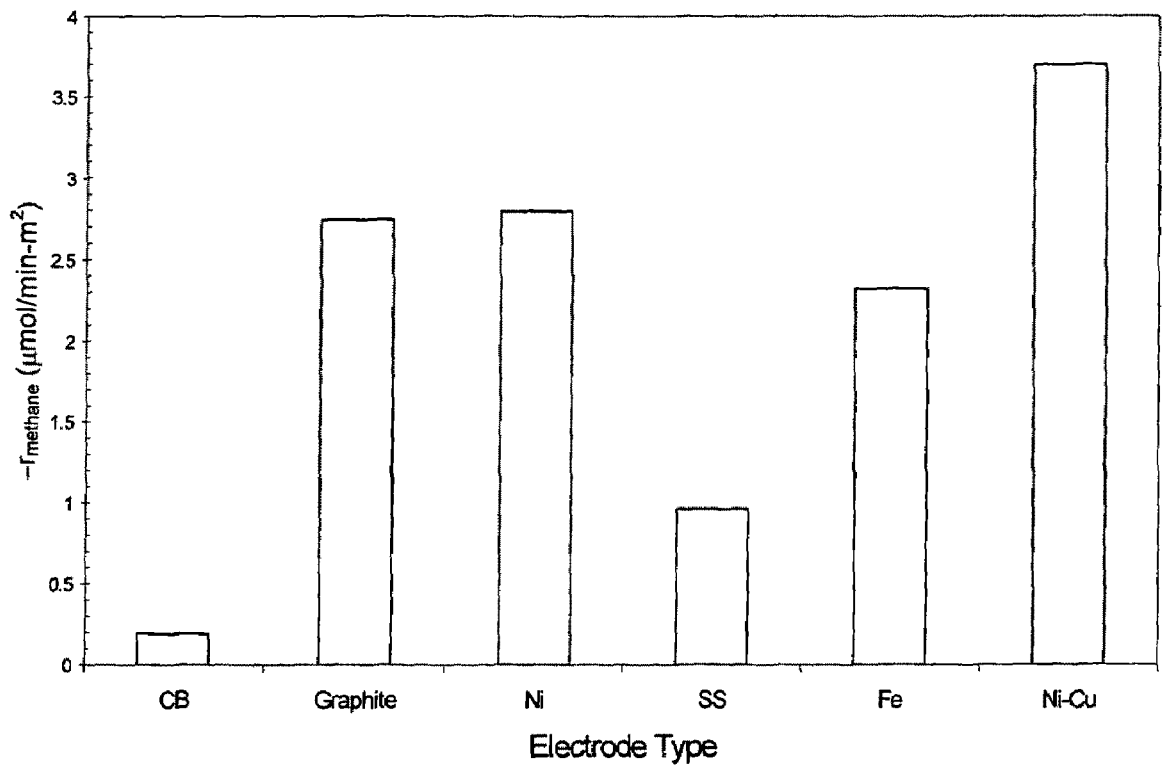

FIG. 8 is a bar graph of the experimental results of methane decomposition at 850° C. using carbon aerosol particles as a catalyst. In this example, carbon aerosol particles were also produced by non-thermal plasma-assisted decomposition of methane using graphite and metal (Fe, Ni, stainless steel, Ni—Cu) electrodes. The catalytic activity is expressed as a rate of methane decomposition per unit of surface area of carbon. The carbon aerosols produced are compared to that of carbon black BP2000 which is shown on the graph as CB. BP2000 is a state-of-the-art carbon catalyst exhibiting highest catalytic activity within the carbon black family; it has surface area of 1500 m²/g.

FIG. 8 shows that carbon aerosols differ in catalytic activity depending on the material of the electrode used. All samples of carbon aerosols were catalytically more active than carbon black BP2000 despite the fact that their average surface area of approximately 100 m²/g, was one order of magnitude less that that of BP2000. Ni—Cu electrodes show a higher level of catalytic activity.

Figure 9:
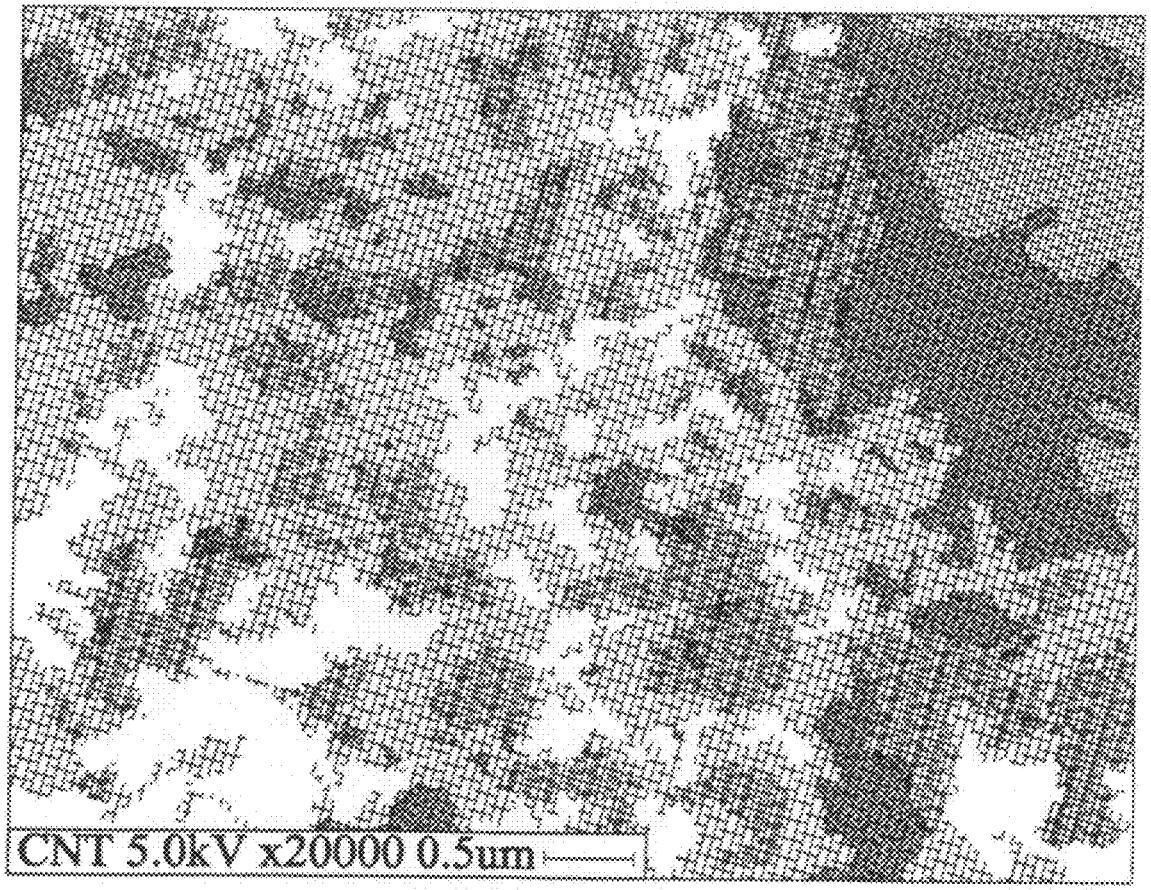
FIG. 9 is a scanning electron micrograph (SEM) image of carbon produced by non-thermal plasma-assisted decomposition of methane.

FIG. 9 is a scanning electron microscope (SEM) image of carbon particles produced from methane exposed to a non-thermal plasma source. The SEM image shows that carbon particles are in the form of spherical agglomerates with the particle size dimension of approximately 0.1 μm to approximately 0.3 μm.

Figure 10:
FIG. 10 is a transmission electron micrograph (TEM) image of carbon produced by non-thermal plasma-assisted decomposition of methane

FIG. 10 is a transmission electron microscope (TEM) image of carbon particles produced from methane exposed to a non-thermal plasma source. The TEM image shows that carbon produced is structurally disordered.

For the first time, a process and apparatus combine the generation of carbon aerosol particles that are used as catalysts in a single-step, catalytic reactor where the in-situ dissociation of hydrocarbon feedstock occurs in the production of hydrogen gas and elemental carbon. The combination of the two processes, namely, the generation of carbon aerosol particles and dissociation of hydrocarbon feedstock, in one apparatus resulted in a significant improvement in existing processes for the catalytic dissociation of hydrocarbon into hydrogen gas and carbon. The need for catalysts regeneration is eliminated, the process is continuous and sustainable and the generation of undesirable carbon oxides by-products is substantially reduced.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An apparatus for producing hydrogen and carbon from hydrocarbon feedstock using a continuous process consisting of:
    a) a reactor vessel consisting of two compartments,
        ai) a first reaction compartment with two inlets and one outlet, a first inlet for an energy source, a second inlet for a carbonaceous material and an outlet for a stream of catalytically active aerosol carbon particles generated in-situ,
        aii) a second reaction compartment that is a catalytic reactor with two inlets and two outlets, a first inlet for hydrocarbon feedstock, a second inlet for catalytically active aerosol carbon particles, a first outlet for hydrogen gas and a second outlet for elemental carbon produced by in-situ dissociation of a hydrocarbon feedstock into hydrogen gas and carbon, and
        aiii) a connection between the outlet of the first reaction compartment and the second inlet of the second reaction compartment;
    b) a means for transporting a carbonaceous material to the second inlet of the first reaction compartment where the carbonaceous material is exposed to an energy input provided to the first inlet of the first reaction compartment wherein an outgoing stream of catalytically active aerosol carbon particles is produced and becomes airborne;
    c) a means for directing the outgoing stream of airborne, catalytically active aerosol carbon particles from the outlet of the first reaction compartment through the connection to the second inlet of the second reaction compartment;
    d) a means for transporting a stream of hydrocarbon feedstock to the first inlet of the second reaction compartment where in-situ dissociation of the hydrocarbon feedstock occurs over the surface of catalytically active aerosol carbon particles entering the second inlet of the second reaction compartment wherein the aerosol carbon particles act as catalyst for the dissociation of the hydrocarbon feedstock into hydrogen gas and elemental carbon; and
    e) a means for collecting hydrogen gas from the first outlet of the second reaction compartment and elemental carbon from the second outlet of the second reaction compartment in a continuous process without catalyst regeneration.

2. The apparatus of claim 1, wherein the energy input directed to the first inlet of the first reaction compartment achieves temperatures in a range from approximately 100° C. to approximately 5000° C. and is provided by at least one of a non-oxidative means, an oxidative means, and a mixture thereof.

3. The apparatus of claim 2, wherein the non-oxidative means of the energy input is at least one of a high temperature source, non-thermal plasma, and irradiation.

4. The apparatus of claim 2, wherein the oxidative means of the energy input is an oxidant selected from at least one of air, oxygen, ozone and nitrous oxide.

5. An apparatus for producing hydrogen and carbon from a hydrocarbon that is a source of carbon aerosol particles using a continuous process consisting of:
    a) a reactor vessel consisting of two compartments,
        ai) a first reaction compartment with two inlets and one outlet, a first inlet for an energy source, a second inlet for a carbonaceous material and an outlet for catalytically active aerosol carbon particles generated in-situ, aii) a second reaction compartment that is a catalytic reactor with two inlets and two outlets, a first inlet for hydrocarbon feedstock, a second inlet for catalytically active aerosol carbon particles, a first outlet for hydrogen gas and a second outlet for elemental carbon produced by in-situ dissociation of a hydrocarbon feedstock into hydrogen gas and elemental carbon, and aiii) a connection between the outlet of the first reaction compartment and the second inlet of the second reaction compartment;

b) a means for dividing the hydrocarbon feedstock into a first stream and a second stream;

c) a means for transporting the first stream of hydrocarbon feedstock of b) to the second inlet of the first reaction compartment where the hydrocarbon is exposed to an energy input directed to the first inlet of the first reaction compartment wherein an outgoing stream of catalytically active carbon aerosol particles is produced and becomes airborne;

d) a means for directing the outgoing stream of airborne catalytically active carbon aerosol particles from the outlet of the first reaction compartment through the connection to the second inlet of the second reaction compartment;

e) a means for transporting the second stream of hydrocarbon feedstock of b) to the first inlet of the second reaction compartment where in situ dissociation of the hydrocarbon feedstock occurs over the surface of catalytically active carbon aerosol particles from d) producing hydrogen gas and elemental carbon; and f) a means for collecting hydrogen gas from the first outlet of the second reaction compartment and elemental carbon from the second outlet of the second reaction compartment in a continuous process without catalyst regeneration.

6. The apparatus of claim 5, wherein the energy input directed to the first inlet of the first reaction compartment achieves temperatures in a range from approximately 100° C. to approximately 5000° C. and is provided by at least one of a non-oxidative means, an oxidative means, and a mixture thereof.

7. The apparatus of claim 6, wherein the non-oxidative means of the energy input is at least one of a high temperature source, non-thermal plasma, and irradiation.

8. The apparatus of claim 6, wherein the oxidative means of the energy input is an oxidant selected from at least one of air, oxygen, ozone, and nitrous oxide.

* * * * *